United States Patent
Wang (10) Patent No.: US 9,890,804 B2
(45) Date of Patent: Feb. 13, 2018

(54) ENGINE SYSTEM UTILIZING HYDRAULIC PRESSURE

(71) Applicant: DOOSAN INFRACORE CO., LTD., Incheon (KR)

(72) Inventor: Taejoong Wang, Gyeonggi-do (KR)

(73) Assignee: Doosan Infracore Co., Ltd., Incheon (KR)

(*) Notice: Subject to any disclaimer, the term of this patent is extended or adjusted under 35 U.S.C. 154(b) by 349 days.

(21) Appl. No.: 14/666,879

(22) Filed: Mar. 24, 2015

(65) Prior Publication Data

US 2015/0267725 A1 Sep. 24, 2015

(30) Foreign Application Priority Data

Mar. 24, 2014 (KR) .......................... 10-2014-0034225
Mar. 24, 2014 (KR) .......................... 10-2014-0034226

(51) Int. Cl.

| | |
|---|---|
| *F15B 21/14* | (2006.01) |
| *F01K 23/06* | (2006.01) |
| *B60H 1/00* | (2006.01) |
| *B60H 1/32* | (2006.01) |
| *E02F 9/20* | (2006.01) |

(Continued)

(52) U.S. Cl.
CPC ......... *F15B 21/14* (2013.01); *B60H 1/00378* (2013.01); *B60H 1/00435* (2013.01); *B60H 1/3222* (2013.01); *E02F 9/2066* (2013.01); *E02F 9/2075* (2013.01); *E02F 9/2217* (2013.01); *F01K 13/02* (2013.01); *F01K 23/065* (2013.01); *F01K 25/08* (2013.01); *F15B 2211/41554* (2013.01);

(Continued)

(58) Field of Classification Search
CPC ............ B60H 1/00378; B60H 1/00435; B60H 1/3222; E02F 9/2066; E02F 9/2075; E02F 9/2217; F01K 7/30; F01K 13/02; F01K 23/065; F01K 25/08; F15B 1/26; F15B 21/14; F15B 2211/41554; F15B 2211/611; F15B 2211/7058; F15B 2211/7135
See application file for complete search history.

(56) References Cited

U.S. PATENT DOCUMENTS

| | | | | |
|---|---|---|---|---|
| 5,201,803 A | * | 4/1993 | Goto ..................... | B60H 1/3222 60/422 |
| 8,659,177 B2 | * | 2/2014 | Fujishima ............. | E02F 9/2217 290/1 R |

(Continued)

FOREIGN PATENT DOCUMENTS

| | | | | | |
|---|---|---|---|---|---|
| DE | 102012003320 A1 | * | 8/2013 | ............ | E02F 9/2292 |
| JP | 2013079626 A | * | 5/2013 | | |

*Primary Examiner* — Logan Kraft
(74) *Attorney, Agent, or Firm* — John D. Veldhuis-Kroeze; Westman, Champlin & Koehler, P.A.

(57) ABSTRACT

An engine system utilizing a hydraulic pressure includes an engine, a hydraulic system having at least one hydraulic pump discharging a hydraulic oil for operating an actuator and a hydraulic oil tank storing the hydraulic oil returned from the actuator, a hydraulic power transmission device connected to a hydraulic line between the hydraulic pump and the hydraulic oil tank and configured to transmit a hydraulic pressure of the hydraulic oil as a driving source, and a vehicular auxiliary device driven by using the hydraulic pressure transmitted from the hydraulic power transmission device as the driving source.

10 Claims, 9 Drawing Sheets

(51) Int. Cl.
*E02F 9/22* (2006.01)
*F01K 13/02* (2006.01)
*F01K 25/08* (2006.01)

(52) U.S. Cl.
CPC .. *F15B 2211/611* (2013.01); *F15B 2211/7058* (2013.01); *F15B 2211/7135* (2013.01)

(56) References Cited

U.S. PATENT DOCUMENTS

| | | | | |
|---|---|---|---|---|
| 9,021,807 | B2 * | 5/2015 | Gaertner | F01K 13/02 |
| | | | | 60/615 |
| 9,284,857 | B2 * | 3/2016 | Ho | F01K 25/08 |
| 9,512,596 | B2 * | 12/2016 | Kang | E02F 9/2075 |
| 2017/0073932 | A1 * | 3/2017 | Hijikata | E02F 9/2075 |

* cited by examiner

ENGINE SYSTEM UTILIZING HYDRAULIC PRESSURE

CROSS-REFERENCE TO RELATED APPLICATION

This application claims priority under 35 USC §119 to Korean Patent Application No. 10-2014-0034225, filed on Mar. 24, 2014 and Korean Patent Application No. 10-2014-0034226, filed on Mar. 24, 2014 in the Korean Intellectual Property Office (KIPO), the contents of which are herein incorporated by reference in their entirety.

BACKGROUND

1. Field

Example embodiments relate to an engine system utilizing a hydraulic pressure. More particularly, example embodiments relate to an engine system using a hydraulic energy in a hydraulic system of an excavator.

2. Description of the Related Art

Generally, an air conditioner for temperature control may be mounted in a cabin of construction machinery in which an engine is installed as a power source. A compressor of the air conditioner may be coupled to a crankshaft of the engine by a belt to be directly driven by the engine.

Accordingly, if the air conditioner operates during vehicle operation, an additional fuel may be consumed for a substantially same output power, thereby deteriorating fuel efficiency and the output power may be reduced while a substantially same amount of fuel is consumed. Further, in development stage of construction machinery, additional processes for tuning and control logic design required for the operation of the air conditioner may be required, thereby increasing development times and costs.

Additionally, auxiliary equipments such as a cooling water pump, a fuel pump, a fuel cooling fan, etc, which assist an operation of the engine, may be directly driven by the engine. Accordingly, fuel efficiency or output power may be reduced when the auxiliary equipments operate.

Further, in order to satisfy exhaust gas emission regulations, an EGR (exhaust gas recirculation) system may be provided in the engine system of the construction machinery. In applications of the EGR system, it may be important to design a simple, durable and controllable EGR valve.

On the other hand, recently, waste energy recovery techniques, which utilize waste energy in an exhaust gas or an engine cooling water to regenerate into electric energy or mechanical energy, have been developed actively.

SUMMARY

Example embodiments provide an engine system capable of increasing fuel efficiency by utilizing a hydraulic energy in construction machinery.

According to example embodiments, an engine system utilizing a hydraulic pressure includes an engine, a hydraulic system having at least one hydraulic pump discharging a hydraulic oil for operating an actuator and a hydraulic oil tank storing the hydraulic oil returned from the actuator, a hydraulic power transmission device connected to a hydraulic line between the hydraulic pump and the hydraulic oil tank and configured to transmit a hydraulic pressure of the hydraulic oil as a driving source, and a vehicular auxiliary device driven by using the hydraulic pressure transmitted from the hydraulic power transmission device as the driving source.

In example embodiments, the hydraulic transmission device may include a hydraulic recovery connector connected to the hydraulic line and having a bypass line for selectively providing a detour for the hydraulic oil and a power transmission hydraulic motor connected to the hydraulic recovery connector and driven by the hydraulic pressure of the hydraulic oil to transfer power to the vehicular auxiliary device.

In example embodiments, the bypass line may include a bypass supply line for supplying the hydraulic oil to the hydraulic motor and a bypass return line for returning the hydraulic oil from the hydraulic motor.

In example embodiments, the hydraulic recovery connector may include a control valve which connects the hydraulic line and the bypass line to each other.

In example embodiments, the hydraulic recovery connector may further include at least one of a regulator and an accumulator which are installed in the bypass line and configured to control the hydraulic pressure of the hydraulic oil.

In example embodiments, the hydraulic system may further include a main control valve which is installed between the hydraulic pump and the actuator and configured to control operation of the actuator, and the hydraulic power transmission device may be connected to the hydraulic line between the main control valve and the hydraulic oil tank.

In example embodiments, the hydraulic pump may include a pilot pump for operating a control device, and the hydraulic power transmission device may be connected to the hydraulic line between the pilot pump and the control device.

In example embodiments, the vehicular auxiliary device may include a compressor of an air conditioner.

In example embodiments, the vehicular auxiliary device may include auxiliary equipments which assist an operation of the engine.

In example embodiments, the vehicular auxiliary device may include a waste heat recovery device for recovering waste heat of the engine.

In example embodiments, the waste heat recovery device may include a Rankine circuit which includes an evaporator for vaporizing an working fluid by the waste heat of the engine, an turbine for generating rotary driving force by making use of expansion of the working fluid via the evaporator, a condenser for condensing the working fluid, and a pump for circulating the working fluid to a circulation path of the working fluid. The hydraulic power transmission device may transmit the hydraulic pressure of the hydraulic oil as a driving source to the pump of the Rankine circuit.

In example embodiments, the working fluid may include an organic working fluid.

According to example embodiments, a vehicular auxiliary device may not be directly driven by a crankshaft of an engine, but driven by using a hydraulic pressure, which is recovered from waste hydraulic energy in the hydraulic system, as a driving source.

Accordingly, fuel efficiency or output power may be prevented from being reduced even though the auxiliary device operates during vehicle operation. Further, in order to satisfy exhaust gas emission regulations and fuel economy target, in development stage of construction machinery, additional processes for tuning and control logic design related to the operation of the auxiliary device may be simplified or omitted to thereby save development times and costs.

Further, a pump of an Organic Rankine cycle system may be powered by using a hydraulic pressure, which is recovered from waste hydraulic energy in the hydraulic system, as a driving source. Accordingly, the Organic Rankine cycle system may be driven by utilizing hydraulic energy wasted from the hydraulic system of the construction machinery such as the excavator, wheel loader, etc.

BRIEF DESCRIPTION OF THE DRAWINGS

Example embodiments will be more clearly understood from the following detailed description taken in conjunction with the accompanying drawings. FIGS. 1 to 9 represent non-limiting, example embodiments as described herein.

DESCRIPTION OF EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
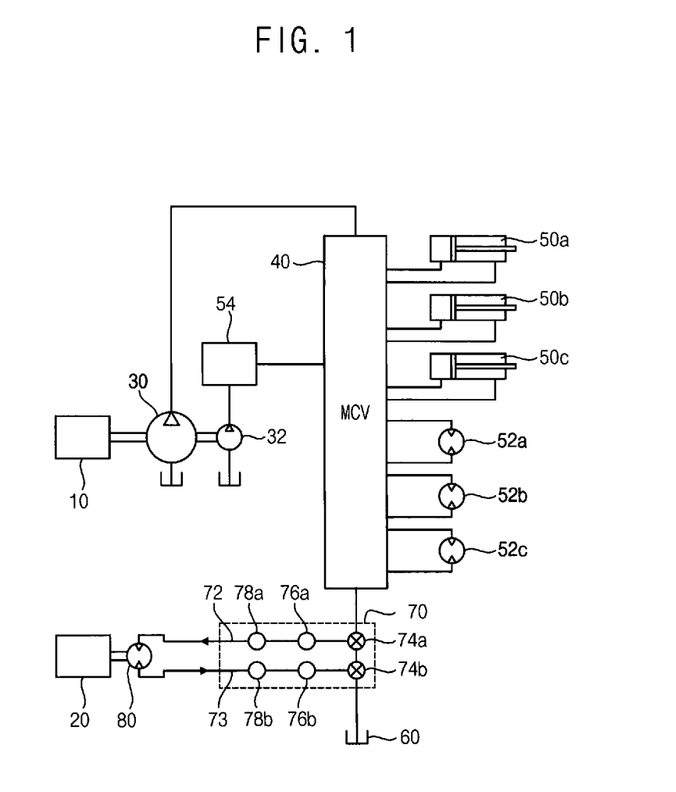
FIG. 1 is a block diagram illustrating construction machinery with an engine system utilizing a hydraulic pressure in accordance with example embodiments.
Figure 2:
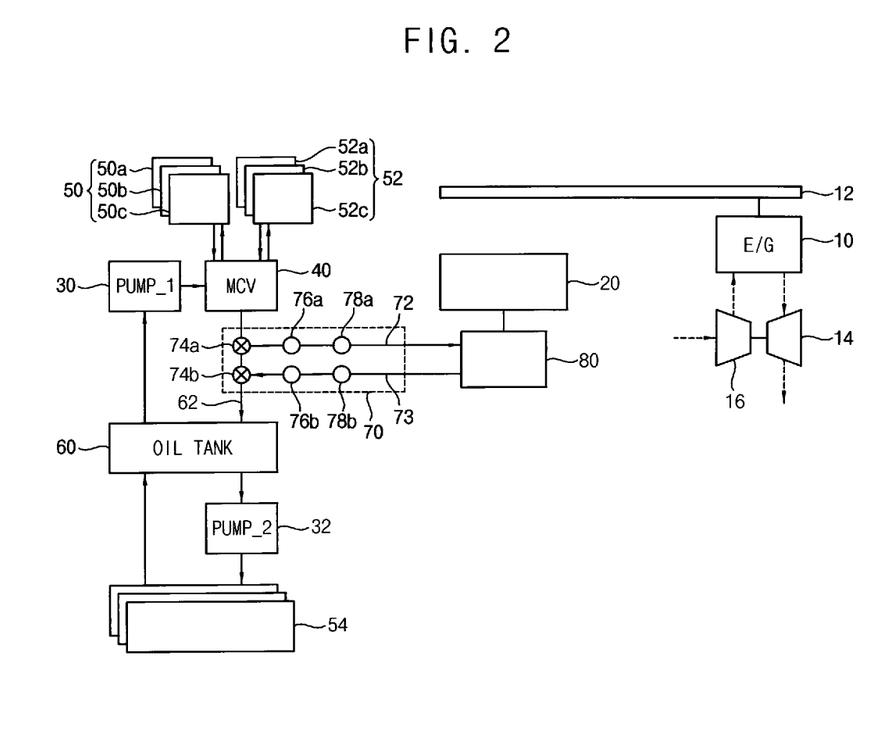
FIG. 2 is a block diagram illustrating the engine system in FIG. 1.

FIG. 1 is a block diagram illustrating construction machinery with an engine system utilizing a hydraulic pressure in accordance with example embodiments. FIG. 2 is a block diagram illustrating the engine system in FIG. 1.

Referring to FIGS. 1 and 2, an engine system may include an internal combustion engine 10, a hydraulic system having at least one hydraulic pump 30, 32 discharging a hydraulic oil for operating actuators 50, 52 and a hydraulic oil tank 60 storing the hydraulic oil returned from the actuator, a vehicular auxiliary device independently driven, not directly driven by the engine 10, a hydraulic power transmission device for transmitting a pressure of the hydraulic oil as a driving source to the vehicular auxiliary device and driving the auxiliary device.

In example embodiments, the engine 10 may include a diesel engine as a driving source for construction machinery, for example, excavator. An exhaust system of the engine 10 may include a turbocharger. A turbine 14 of the turbocharger may convert energy of an exhaust gas exhausted from an exhaust manifold of the engine 10 into mechanical energy to drive a compressor 16 of the turbocharger, and then an air compressed by the compressor 16 may be supplied to an intake manifold.

The engine 10 may be connected to a first pump 30 via a power take off (PTO). A second pump 32 may be directly connected to the first pump 30. Accordingly, an output power of the engine 10 may be transmitted to the first pump 30 and the second pump 32 respectively.

The first pump 30 may be connected to a main control valve (MCV) 40 through a high pressure hydraulic line. The main control valve 40 may be a control device for performing a control in a hydraulic system of the excavator. The construction machinery such as the excavator may include a lower traveling body, an upper swing body rotatably mounted on the lower traveling body, a cab installed in the upper swing body, and a working device including a boom, an arm and a bucket.

The main control valve 40 may be connected to a plurality of actuators 50 including a boom cylinder 50a, an arm cylinder 50b and a bucket cylinder 50c through a high pressure hydraulic line respectively. Accordingly, each of the actuators such as the boom cylinder, the arm cylinder and the bucket cylinder may be driven by a hydraulic pressure of the hydraulic oil discharged from the first pump 30.

The main control valve 40 may be connected to a plurality of actuators 52 including a right traveling hydraulic motor 52a, a left traveling hydraulic motor 52b and a swing motor 52c through a high pressure hydraulic line respectively. Accordingly, each of the actuators such as the right traveling hydraulic motor, the left traveling hydraulic motor and the swing motor may be driven by the hydraulic pressure of the hydraulic oil discharged from the first pump 30.

The hydraulic oil used in the actuator may be returned to a hydraulic oil tank 60 through a return hydraulic line 62. Here, the hydraulic oil flowing through the return hydraulic line 62 may have a pressure enough to drive, for example, an auxiliary device related to the engine.

The second pump 32 may be connected to a control device such as a control lever 54 through a pilot line. The second pump 32 may discharge a pilot oil. Accordingly, the pilot oil discharged from the second pump 32 such as a sub-pump, which is on standby at a signal input side of the main control valve 40, may open a corresponding control valve according to operations of an operator and may be returned to the hydraulic oil tank 60 through the return hydraulic line. Here, the pilot oil flowing through the return hydraulic line may have a pressure enough to drive, for example, the auxiliary device related to the engine.

In example embodiments, the hydraulic power transmission device may be connected to a hydraulic line between the hydraulic pump 30 and the hydraulic oil tank 60 to transmit a hydraulic pressure of the hydraulic oil as a driving source to the auxiliary device related to the engine. Accordingly, the hydraulic power transmission device may utilize the energy contained in the hydraulic oil after used in the hydraulic system, to drive the vehicular auxiliary device.

The hydraulic transmission device may include a hydraulic recovery connector 70 and a power transmission hydraulic motor 80. The hydraulic recovery connector 70 may be connected to the return hydraulic line 62 and may include a bypass line for selectively providing a detour for the hydraulic oil. The power transmission hydraulic motor 80 may be connected to the hydraulic recovery connector 70 to be driven by the hydraulic pressure of the hydraulic oil.

The bypass line may include a bypass supply line 72 for supplying the hydraulic oil to the hydraulic motor 80 and a bypass return line 73 for returning the hydraulic oil from the hydraulic motor 80 to the hydraulic oil tank 60. The bypass supply line 72 may be connected to the return hydraulic line 62 by a first control valve 74a, and the bypass return line 73 may be connected to the return hydraulic line 62 by a second control valve 74b.

In example embodiments, the hydraulic recovery connector may further include at least one of a regulator and an accumulator which are installed in the bypass line and configured to control a hydraulic pressure of the hydraulic oil. The regulator and the accumulator may precisely adjust a pressure, a flow rate, etc of the hydraulic oil flowing through the bypass line. For example, a first regulator 76a and a first accumulator 78a may be installed in the bypass supply line 72 and a second regulator 76b and a second accumulator 78b may be installed in the bypass return line 73.

The power transmission hydraulic motor 80 may be connected to the bypass supply line 72 and the bypass return line 73 of the hydraulic recovery connector. The relatively high pressure hydraulic oil returned from the main control valve 40 may be supplied to an A port (inlet port) of the power transmission hydraulic motor 80 through the bypass supply line 72 to drive the hydraulic motor 80 and then may be returned through the bypass return line 73 to the hydraulic oil tank 60. Accordingly, as the hydraulic motor 80 is driven, the vehicular auxiliary device connected to an output side of the hydraulic motor 80 may operate.

In example embodiments, the vehicular auxiliary device may be a compressor of an air conditioner 20. The power transmission hydraulic motor 80 may operate the compressor of the air conditioner 20 to compress a refrigerant used in a refrigeration cycle of the air conditioner 20.

A compressor of a conventional air conditioner may be connected to a crankshaft of an engine so that a portion of an output power of the engine may be directly used to operate the air conditioner. Accordingly, if the air conditioner operates during vehicle operation, an additional fuel may be consumed in order to maintain a substantially same output power, thereby deteriorating fuel efficiency and the output power may be reduced in order to maintain a substantially same amount of fuel consumption.

In example embodiments, the air conditioner 20 may not be directly driven by the crankshaft 12 of the engine 10, but driven by using the hydraulic pressure, which is recovered from waste hydraulic energy in the hydraulic system, as a driving source. Accordingly, the compressor of the air conditioner 20 may be driven by the hydraulic power transmission device powered by the waste hydraulic energy of the hydraulic oil, so that fuel efficiency or output power may be prevented from being reduced even though the air conditioner 20 operates during vehicle operation.

Further, in order to satisfy exhaust gas emission regulations and fuel economy target, when a tuning process is performed in development stage of construction machinery, additional processes for tuning and control logic design required for the operation of the air conditioner 20 may be simplified or omitted to thereby save development times and costs.

Figure 3:
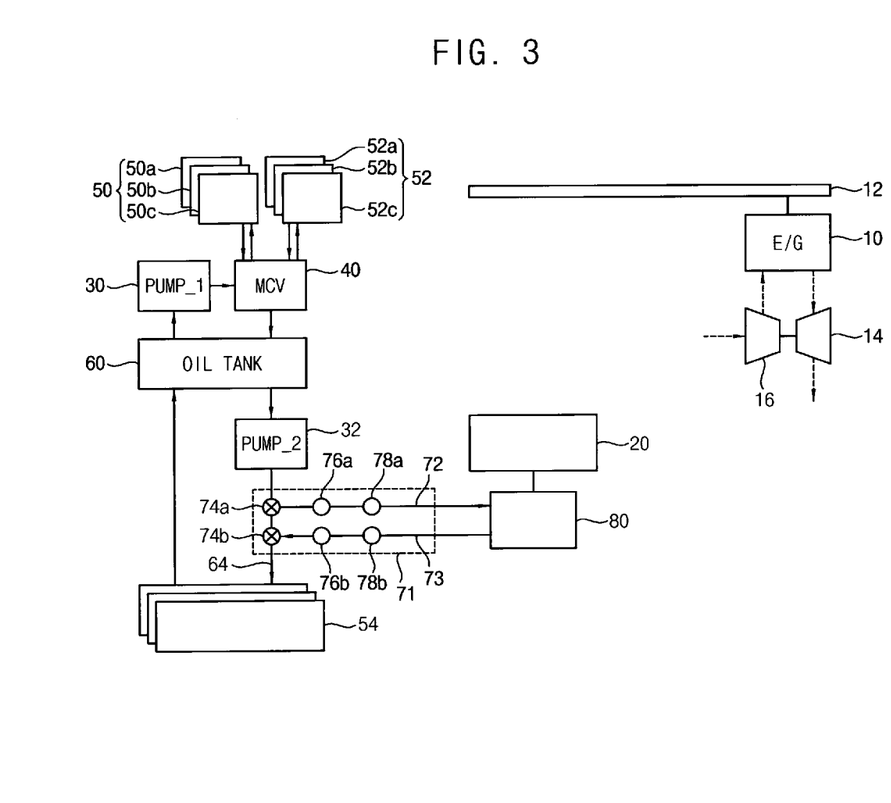
FIG. 3 is a block diagram illustrating an engine system utilizing a hydraulic pressure in accordance with example embodiments.

FIG. 3 is a block diagram illustrating an engine system utilizing a hydraulic pressure in accordance with example embodiments. The engine system may be substantially the same as or similar to the engine system described with reference to FIGS. 1 and 2, except for a hydraulic line which a hydraulic power transmission device is connected to. Thus, same reference numerals will be used to refer to the same or like elements, and any further repetitive explanation concerning the above elements will be omitted.

Referring to FIG. 3, a second pump 32 may be connected to a control device such as a control lever 54 through a pilot line 64. The second pump 32 as a sub-pump may discharge a pilot oil. Here, the pilot oil flowing through the pilot line 64 may have a pressure enough to drive, for example, an auxiliary device related to an engine.

In example embodiments, a hydraulic power transmission device may include a hydraulic recovery connector 71 and a power transmission hydraulic motor 80. The hydraulic recovery connector 71 may be connected to the pilot line 64 and may include a bypass line for selectively providing a detour for the pilot oil. The power transmission hydraulic motor 80 may be connected to the hydraulic recovery connector 71 to be driven by a hydraulic pressure of the pilot oil.

The bypass line may include a bypass supply line 72 for supplying the pilot oil to the hydraulic motor 80 and a bypass return line 73 for returning the pilot oil from the hydraulic motor 80 to a hydraulic oil tank 60. The bypass supply line 72 may be connected to a the pilot line 64 by a first control valve 74a, and the bypass return line 73 may be connected to the pilot line 64 by a second control valve 74b.

The power transmission hydraulic motor 80 may be connected to the bypass supply line 72 and the bypass return line 73 of the hydraulic recovery connector. The relatively high pressure pilot oil discharge from the second pump 32 may be supplied to an A port (inlet port) of the power transmission hydraulic motor 80 through the bypass supply line 72 to drive the hydraulic motor 80 and then may be returned through the bypass return line 73 to the hydraulic oil tank 60. Accordingly, as the hydraulic motor 80 is driven, the vehicular auxiliary device connected to an output side of the hydraulic motor 80 may operate.

In example embodiments, the vehicular auxiliary device may be a compressor of an air conditioner 20. The power transmission hydraulic motor 80 may operate the compressor of the air conditioner 20 to compress a refrigerant used in a refrigeration cycle of the air conditioner 20.

The air conditioner 20 may not be directly driven by a crankshaft 12 of an engine 10 but driven independently from the crankshaft 12 by using the hydraulic pressure, which is recovered from waste hydraulic energy in the hydraulic system, as a driving source. Accordingly, the compressor of the air conditioner 20 may be driven by the hydraulic power transmission device powered by the waste hydraulic energy of the working oil, so that fuel efficiency or output power may be prevented from being reduced even though the air conditioner 20 operates during vehicle operation.

Figure 4:
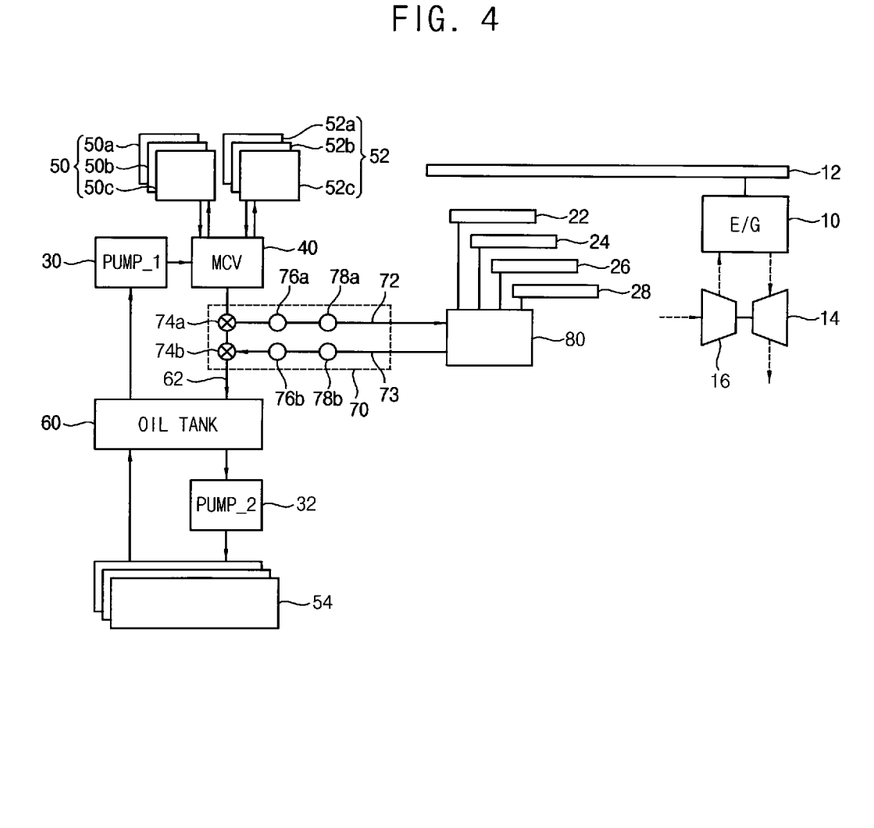
FIG. 4 is a block diagram illustrating an engine system utilizing a hydraulic pressure in accordance with example embodiments.

FIG. 4 is a block diagram illustrating an engine system utilizing a hydraulic pressure in accordance with example embodiments. The engine system may be substantially the same as or similar to the engine system described with reference to FIGS. 1 and 2, except for a vehicular auxiliary device driven by a hydraulic power transmission device. Thus, same reference numerals will be used to refer to the same or like elements, and any further repetitive explanation concerning the above elements will be omitted.

Referring to FIG. 4, a vehicular auxiliary device may include auxiliary equipments which assist an operation of an engine 10. Examples of the auxiliary equipments may be a cooling water pump 22, a fuel pump 24, a cooling fan 26, other equipment 28, etc. A power transmission hydraulic motor 80 may operate the auxiliary equipments to assist the operation of the engine 10.

The vehicular auxiliary device may not be directly driven by a crankshaft 12 of the engine 10 but driven independently from the crankshaft 12 by using a hydraulic pressure, which is recovered from waste hydraulic energy in a hydraulic system, as a driving source. Accordingly, the auxiliary equipments may be driven by a hydraulic power transmission device powered by the waste hydraulic energy of the working oil, so that fuel efficiency or output power may be prevented from being reduced even though the vehicular auxiliary device operates during vehicle operation. Further, in development stage of construction machinery, additional processes for tuning and control logic design related to the operation of the auxiliary device may be simplified.

Figure 5:
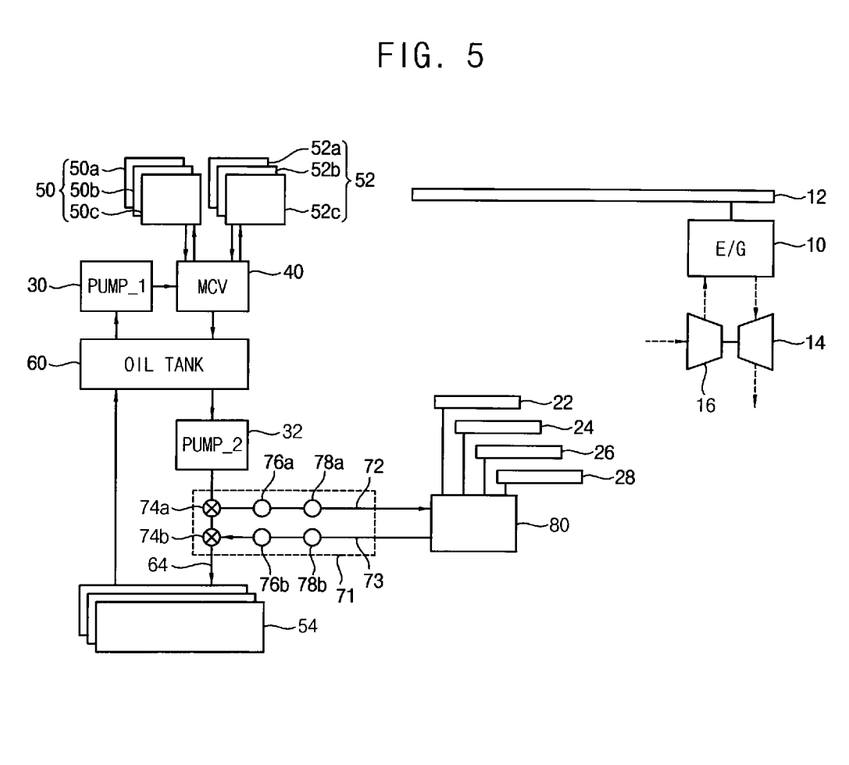
FIG. 5 is a block diagram illustrating an engine system utilizing a hydraulic pressure in accordance with example embodiments.

FIG. 5 is a block diagram illustrating an engine system utilizing a hydraulic pressure in accordance with example embodiments. The engine system may be substantially the same as or similar to the engine system described with reference to FIG. 4, except for a hydraulic line which a hydraulic power transmission device is connected to. Thus, same reference numerals will be used to refer to the same or like elements, and any further repetitive explanation concerning the above elements will be omitted.

Referring to FIG. 5, a hydraulic power transmission device may include a hydraulic recovery connector 71 and a power transmission hydraulic motor 80. The hydraulic recovery connector 71 may be connected to a pilot line 64 and may include a bypass line for selectively providing a detour for a pilot oil. The power transmission hydraulic motor 80 may be connected to the hydraulic recovery connector 71 to be driven by a hydraulic pressure of the pilot oil.

The bypass line may include a bypass supply line 72 for supplying the pilot oil to the hydraulic motor 80 and a bypass return line 73 for returning the pilot oil from the hydraulic motor 80 to a hydraulic oil tank 60. The bypass supply line 72 may be connected to a the pilot line 64 by a first control valve 74a, and the bypass return line 73 may be connected to the pilot line 64 by a second control valve 74b.

The power transmission hydraulic motor 80 may be connected to the bypass supply line 72 and the bypass return line 73 of the hydraulic recovery connector. The relatively high pressure pilot oil discharge from the second pump 40 may be supplied to an A port (inlet port) of the power transmission hydraulic motor 80 through the bypass supply line 72 to drive the hydraulic motor 80 and then may be returned through the bypass return line 73 to the hydraulic oil tank 60. Accordingly, as the hydraulic motor 80 is driven, the vehicular auxiliary device connected to an output side of the hydraulic motor 80 may operate.

Figure 6:
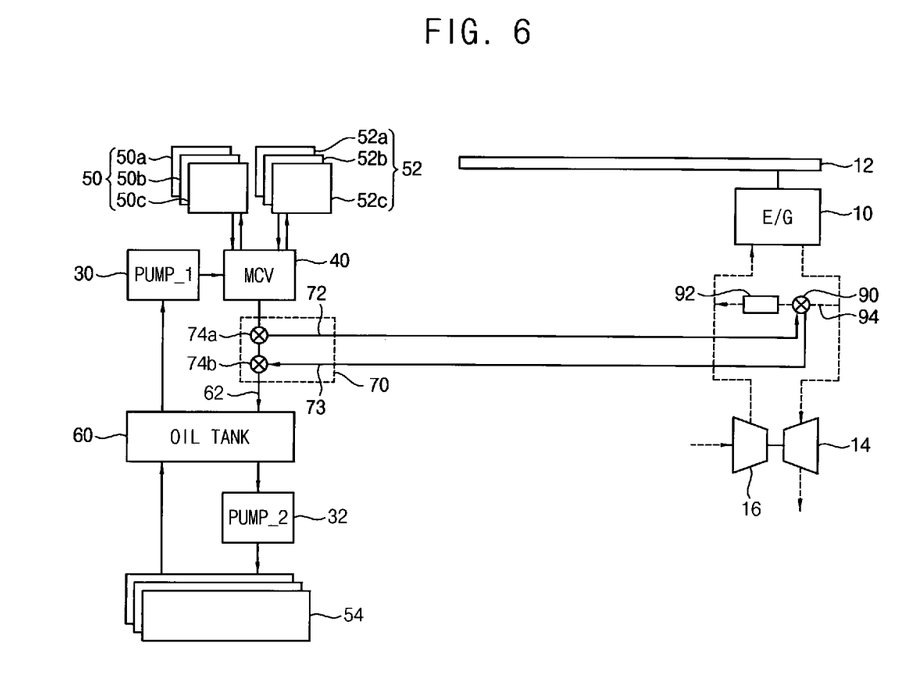
FIG. 6 is a block diagram illustrating an engine system utilizing a hydraulic pressure in accordance with example embodiments.

FIG. 6 is a block diagram illustrating an engine system utilizing a hydraulic pressure in accordance with example embodiments. The engine system may be substantially the same as or similar to the engine system described with reference to FIGS. 1 and 2, except for a vehicular auxiliary device driven by a hydraulic power transmission device. Thus, same reference numerals will be used to refer to the same or like elements, and any further repetitive explanation concerning the above elements will be omitted.

Referring to FIG. 6, a vehicular auxiliary device may include an EGR (exhaust gas recirculation) valve 90 of an EGR system as auxiliary equipment. An intake manifold may be connected to an exhaust manifold by an EGR line 94, and the EGR valve 90 and an EGR cooler 92 may be installed in the EGR line 94. The EGR valve 90 may control an amount of an exhaust gas recirculated through the EGR line 94, and the EGR cooler 92 may cool the recirculated exhaust gas. Accordingly, the EGR system may recirculate a portion of the exhaust gas exhausted from an engine 10 again to the intake manifold, to thereby decrease a combustion temperature of the engine 10 and reduce NOx emissions.

In example embodiments, a hydraulic power transmission device may include a hydraulic recovery connector 70 and a valve driving device of the EGR valve 90. The hydraulic recovery connector 70 may be connected to a return hydraulic line 62 and may include a bypass line for selectively providing a detour for a hydraulic oil. The valve driving device of the EGR valve 90 may be connected to the hydraulic recovery connector 70 to be driven by a hydraulic pressure of the hydraulic oil.

The valve driving device of the EGR valve 90 may be connected to a bypass supply line 72 and a bypass return line 73 of the hydraulic recovery connector. The hydraulic oil supplied through the bypass supply line 72 may power the valve driving device and then may be returned through the bypass return line 73 to a hydraulic oil tank 60.

Accordingly, the EGR valve 90 may be driven by the valve driving device powered by the waste hydraulic energy of the hydraulic oil in the hydraulic system. Thus, fuel efficiency or output power may be prevented from being reduced even though the EGR system operates during vehicle operation.

Figure 7:
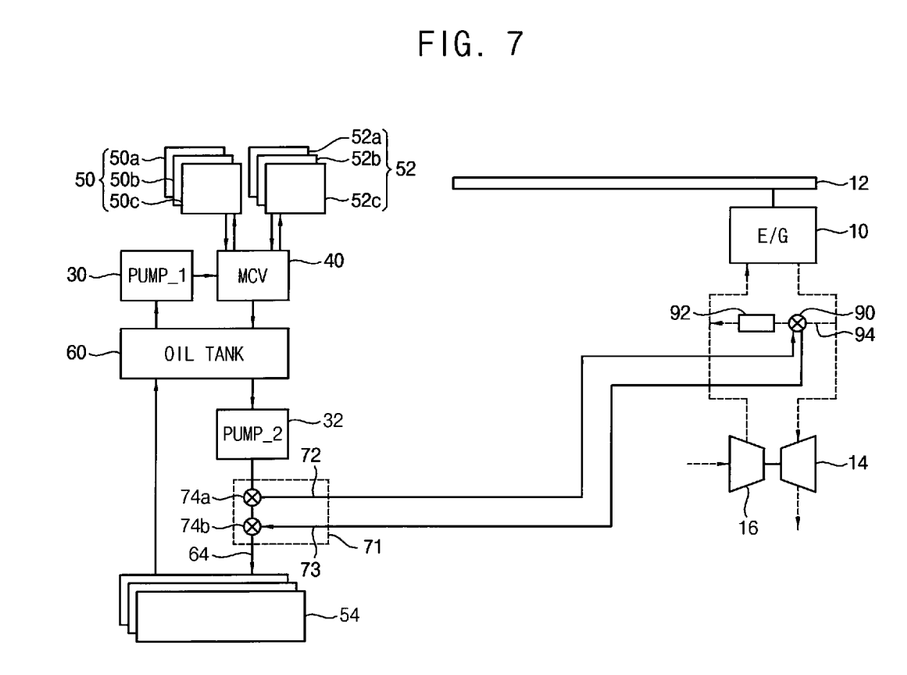
FIG. 7 is a block diagram illustrating an engine system utilizing a hydraulic pressure in accordance with example embodiments.

FIG. 7 is a block diagram illustrating an engine system utilizing a hydraulic pressure in accordance with example embodiments. The engine system may be substantially the same as or similar to the engine system described with reference to FIG. 6, except for a hydraulic line which a hydraulic power transmission device is connected to. Thus, same reference numerals will be used to refer to the same or like elements, and any further repetitive explanation concerning the above elements will be omitted.

Referring to FIG. 7, a hydraulic power transmission device may include a hydraulic recovery connector 71 and a valve driving device of the EGR valve 90. The hydraulic recovery connector 71 may be connected to a pilot line 64 and may include a bypass line for selectively providing a detour for a pilot oil. The valve driving device of the EGR valve 90 may be connected to the hydraulic recovery connector 71 to be driven by a hydraulic pressure of the pilot oil.

The valve driving device of the EGR valve 90 may be connected to a bypass supply line 72 and a bypass return line 73 of the hydraulic recovery connector. The hydraulic oil supplied through the bypass supply line 72 may power the valve driving device and then may be returned through the bypass return line 73 to a hydraulic oil tank 60.

Accordingly, the EGR valve 90 may be driven by the valve driving device powered by the waste hydraulic energy of the hydraulic oil in the hydraulic system. Thus, fuel efficiency or output power may be prevented from being reduced even though the EGR system operates during vehicle operation.

Figure 8:
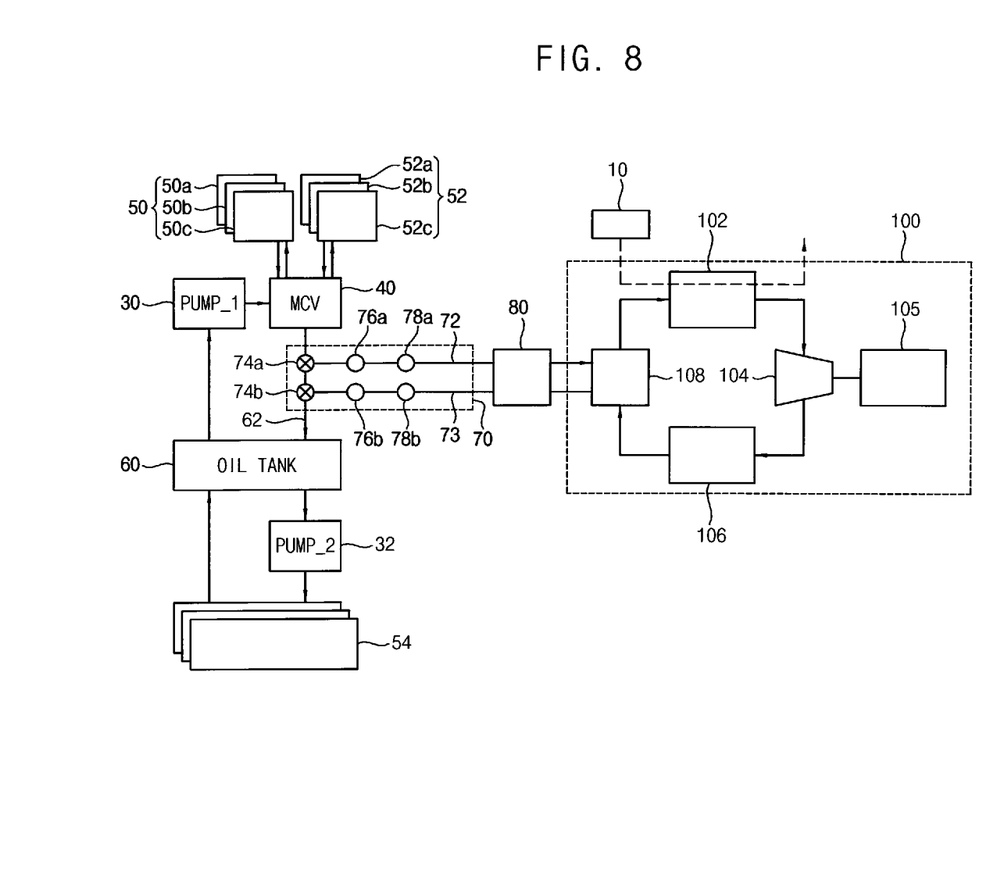
FIG. 8 is a block diagram illustrating an engine system utilizing a hydraulic pressure in accordance with example embodiments.

FIG. 8 is a block diagram illustrating an engine system utilizing a hydraulic pressure in accordance with example embodiments. The engine system may be substantially the same as or similar to the engine system described with reference to FIGS. 1 and 2, except for a vehicular auxiliary device driven by a hydraulic power transmission device. Thus, same reference numerals will be used to refer to the same or like elements, and any further repetitive explanation concerning the above elements will be omitted.

Referring to FIG. 8, a vehicular auxiliary device may include a waste heat recovery device for recovering waste heat of an engine 10. For example, the waste heat recovery device may include a Rankine circuit 100.

In example embodiments, the Rankine circuit 100 may include an evaporator 102 for vaporizing an working fluid by the waste heat of the engine 10, an turbine 104 for generating rotary driving force by making use of expansion of the working fluid which has been heated into superheated state, a condenser 106 for condensing the working fluid by a cooling water, and a pump 108 for circulating the working fluid, which are sequentially arranged in the circulation path of the working fluid, as viewed in the flowing direction of the working fluid, to perform a Rankine cycle. Here, a generator 105 may be directly coupled to the turbine 104 to transform mechanical energy into electric energy.

For example, an exhaust gas may flow from an exhaust manifold of the engine 10 out of an exhaust pipe. The exhaust gas may flow through the evaporator 102 of the Rankine circuit 100 to heat the working fluid so that waste heat of the engine is transferred from the exhaust gas to the working fluid flowing through the closed loop of the Rankine circuit. Additionally, the evaporator 102 of the Rankine circuit 100 may absorb heat from a recirculated exhaust gas flowing through an EGR line of an EGR system.

The Rankine circuit 100 may be an Organic Rankine circuit using an organic working fluid. For example, the organic working fluid may include an organic solvent having high vapor pressure and low boiling point, such as Freon, toluene, etc.

As illustrated in FIGS. 1 and 8, an engine 10 may be connected to a first pump 30 via a power take off (PTO). A second pump 32 may be directly connected to the first pump 30. Accordingly, an output power of the engine 10 may be transmitted to the first pump 30 and the second pump 32 respectively.

The first pump 30 may be connected to a main control valve (MCV) 40 through a high pressure hydraulic line. The main control valve 40 may be a control device for performing a control in a hydraulic system of an excavator. A construction machinery such as the excavator may include a lower traveling body, an upper swing body rotatably mounted on the lower traveling body, a cab installed in the upper swing body, and a working device including a boom, an arm and a bucket.

The main control valve 40 may be connected to a plurality of actuators 50 including a boom cylinder 50a, an arm cylinder 50b and a bucket cylinder 50c through a high pressure hydraulic line respectively. Accordingly, each of the actuators such as the boom cylinder, the arm cylinder and the bucket cylinder may be driven by a hydraulic pressure of the hydraulic oil discharged from the first pump 30.

The main control valve 40 may be connected to a plurality of actuators 52 including a right traveling hydraulic motor 52a, a left traveling hydraulic motor 52b and a swing motor 52c through a high pressure hydraulic line respectively. Accordingly, each of the actuators such as the right traveling hydraulic motor, the left traveling hydraulic motor and the swing motor may be driven by the hydraulic pressure of the hydraulic oil discharged from the first pump 30.

The hydraulic oil used in the actuator may be returned to a hydraulic oil tank 60 through a return hydraulic line 62. Here, the hydraulic oil flowing through the return hydraulic line 62 may have a pressure enough to drive, for example, the pump 108 of the Rankine circuit 100.

The second pump 32 may be connected to a control device such as a control lever 54 through a pilot line. The second pump 32 may discharge a pilot oil. Accordingly, the pilot oil discharged from the second pump 32 such as a sub-pump, which is on standby at a signal input side of the main control valve 40, may open a corresponding control valve according to operations of an operator and may be returned to the hydraulic oil tank 60 through the return hydraulic line. Here, the pilot oil flowing through the return hydraulic line may have a pressure enough to drive, for example, the pump 108 of the Rankine circuit 100.

In example embodiments, the hydraulic power transmission device may be connected to a hydraulic line between the hydraulic pump 30 and the hydraulic oil tank 60 to transmit a hydraulic pressure of the hydraulic oil as a driving source to the pump 108 of the Rankine circuit 100. Accordingly, the hydraulic power transmission device may utilize the energy contained in the hydraulic oil after used in the hydraulic system, to drive the Organic Rankine cycle system.

The hydraulic transmission device may include a hydraulic recovery connector 70 and a power transmission hydraulic motor 80. The hydraulic recovery connector 70 may be connected to the return hydraulic line 62 and may include a bypass line for selectively providing a detour for the hydraulic oil. The power transmission hydraulic motor 80 may be connected to the hydraulic recovery connector 70 to be driven by the hydraulic pressure of the hydraulic oil.

The bypass line may include a bypass supply line 72 for supplying the hydraulic oil to the hydraulic motor 80 and a bypass return line 73 for returning the hydraulic oil from the hydraulic motor 80 to the hydraulic oil tank 60. The bypass supply line 72 may be connected to the return hydraulic line 62 by a first control valve 74a, and the bypass return line 73 may be connected to the return hydraulic line 62 by a second control valve 74b.

In example embodiments, the hydraulic recovery connector may further include at least one of a regulator and an accumulator which are installed in the bypass line and configured to control a hydraulic pressure of the hydraulic oil. The regulator and the accumulator may precisely adjust a pressure, a flow rate, etc of the hydraulic oil flowing through the bypass line. For example, a first regulator 76a and a first accumulator 78a may be installed in the bypass supply line 72 and a second regulator 76b and a second accumulator 78b may be installed in the bypass return line 73.

The power transmission hydraulic motor 80 may be connected to the bypass supply line 72 and the bypass return line 73 of the hydraulic recovery connector. The relatively high pressure hydraulic oil returned from the main control valve 40 may be supplied to an A port (inlet port) of the power transmission hydraulic motor 80 through the bypass supply line 72 to drive the hydraulic motor 80 and then may be returned through the bypass return line 73 to the hydraulic oil tank 60. Accordingly, as the hydraulic motor 80 is driven, the pump 108 of the Rankine circuit 100 connected to an output side of the hydraulic motor 80 may operate. Thus, the Organic Rankine cycle system may be driven by utilizing the hydraulic energy wasted from the hydraulic system of the construction machinery such as the excavator.

Figure 9:
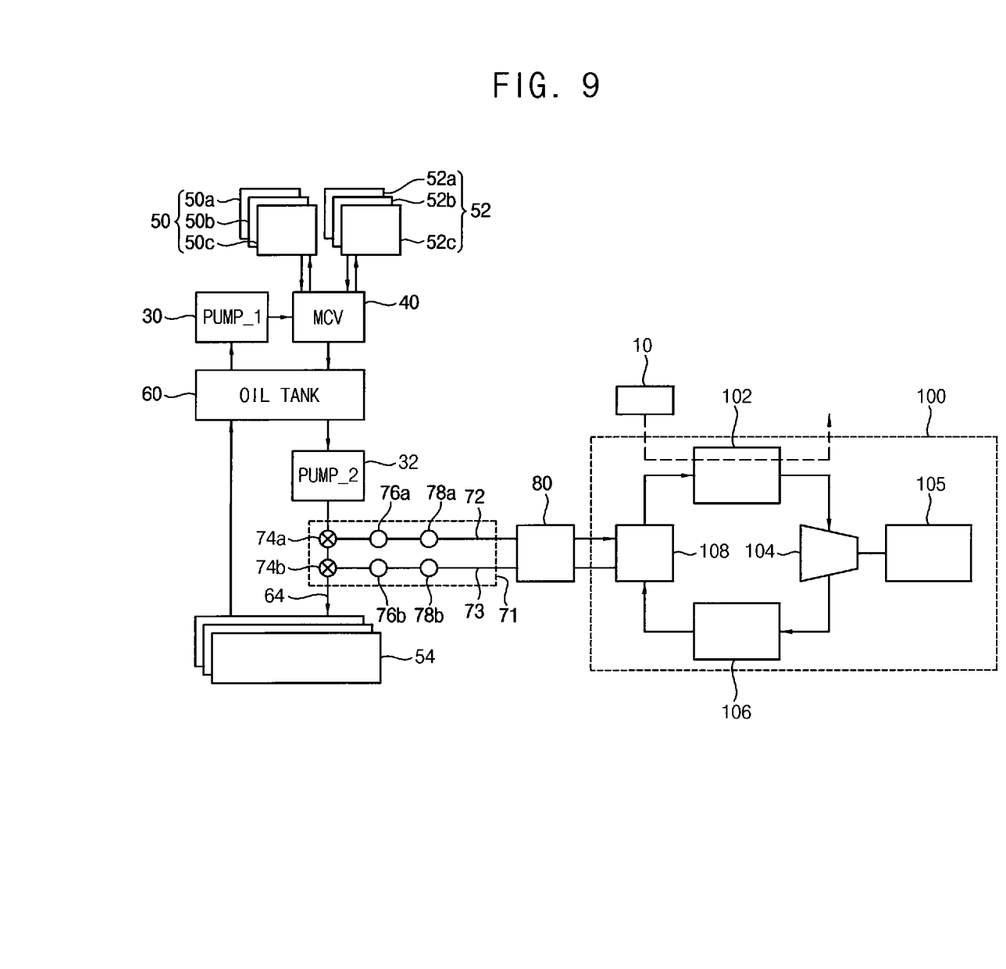
FIG. 9 is a block diagram illustrating an engine system utilizing a hydraulic pressure in accordance with example embodiments.

FIG. 9 is a block diagram illustrating an engine system utilizing a hydraulic pressure in accordance with example embodiments. The engine system may be substantially the same as or similar to the engine system described with reference to FIG. 8, except for a hydraulic line which a hydraulic power transmission device is connected to. Thus, same reference numerals will be used to refer to the same or like elements, and any further repetitive explanation concerning the above elements will be omitted.

Referring to FIG. 9, a second pump 32 may be connected to a control device such as a control lever 54 through a pilot line 64. The second pump 32 as a sub-pump may discharge a pilot oil. Here, the pilot oil flowing through the pilot line 64 may have a pressure enough to drive, for example, a pump 108 of a Rankine circuit 100.

In example embodiments, a hydraulic power transmission device may include a hydraulic recovery connector 71 and a power transmission hydraulic motor 80. The hydraulic recovery connector 71 may be connected to the pilot line 64 and may include a bypass line for selectively providing a detour for the pilot oil. The power transmission hydraulic motor 80 may be connected to the hydraulic recovery connector 71 to be driven by a hydraulic pressure of the pilot oil.

The bypass line may include a bypass supply line 72 for supplying the pilot oil to the hydraulic motor 80 and a bypass return line 73 for returning the pilot oil from the hydraulic motor 80 to a hydraulic oil tank 60. The bypass supply line 72 may be connected to a the pilot line 64 by a first control valve 74a, and the bypass return line 73 may be connected to the pilot line 64 by a second control valve 74b.

The power transmission hydraulic motor 80 may be connected to the bypass supply line 72 and the bypass return line 73 of the hydraulic recovery connector. The relatively high pressure pilot oil discharge from the second pump 32 may be supplied to an A port (inlet port) of the power transmission hydraulic motor 80 through the bypass supply line 72 to drive the hydraulic motor 80 and then may be returned through the bypass return line 73 to the hydraulic oil tank 60. Accordingly, as the hydraulic motor 80 is driven, the pump 108 of the Rankine circuit 100 connected to an output side of the hydraulic motor 80 may operate. Thus, the Organic Rankine cycle system may be driven by utilizing the hydraulic energy wasted from the hydraulic system of the construction machinery such as the excavator.

Further, the above engine system may be applied to various types of construction machinery. For example, the engine system may be applied to a wheel loader.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An engine system utilizing a hydraulic pressure, comprising:
   an engine;
   a hydraulic system having at least one hydraulic pump discharging a hydraulic oil for operating an actuator, a main control valve installed between the hydraulic pump and the actuator and controlling a flow direction of the hydraulic oil from the hydraulic pump to the actuator to selectively supply the hydraulic oil to the actuator for controlling operation of the actuator and a hydraulic oil tank storing the hydraulic oil returned from the actuator through a return hydraulic line;

a hydraulic power transmission device connected to the return hydraulic line between the main control valve and the hydraulic oil tank and configured to transmit a hydraulic pressure of the hydraulic oil flowing through the return hydraulic line after the hydraulic oil is discharged from the hydraulic pump and supplied to the actuator to drive the actuator, as a driving source; and a vehicular auxiliary device driven by using the hydraulic pressure transmitted from the hydraulic power transmission device as the driving source, wherein the hydraulic power transmission device comprises a hydraulic recovery connector connected to the return hydraulic line and including a bypass line for selectively providing a detour for the hydraulic oil, and a power transmission hydraulic motor connected to the hydraulic recovery connector and driven by the hydraulic pressure of the hydraulic oil to transfer power to the vehicular auxiliary device, wherein the bypass line comprises a bypass supply line for supplying the hydraulic oil to the hydraulic motor and a bypass return line for returning the hydraulic oil from the hydraulic motor, and wherein the hydraulic recovery connector further comprises a first control valve installed in the bypass supply line to connect the bypass supply line to the return hydraulic line and a second control valve installed in the bypass return line to connect the bypass return line to the return hydraulic line.

2. The engine system of claim 1, wherein the hydraulic recovery connector further comprises at least one of a regulator and an accumulator which are installed in the bypass line and configured to control the hydraulic pressure of the hydraulic oil.

3. The engine system of claim 1, wherein the hydraulic pump comprises a pilot pump for operating the main control valve.

4. The engine system of claim 1, wherein the vehicular auxiliary device comprises a compressor of an air conditioner.

5. The engine system of claim 1, wherein the vehicular auxiliary device comprises auxiliary equipment which assists an operation of the engine.

6. An engine system utilizing a hydraulic pressure, comprising:

an engine;

a hydraulic system having at least one hydraulic pump discharging a hydraulic oil for operating an actuator, a main control valve installed between the hydraulic pump and the actuator and controlling a flow direction of the hydraulic oil from the hydraulic pump to the actuator to selectively supply the hydraulic oil to the actuator for controlling operation of the actuator and a hydraulic oil tank storing the hydraulic oil returned from the actuator through a return hydraulic line;

a hydraulic power transmission device connected to the return hydraulic line between the main control valve and the hydraulic oil tank and configured to transmit a hydraulic pressure of the hydraulic oil flowing through the return hydraulic line after the hydraulic oil is discharged from the hydraulic pump and supplied to the actuator to drive the actuator, as a driving source; and a vehicular auxiliary device driven by using the hydraulic pressure transmitted from the hydraulic power transmission device as the driving source, wherein the hydraulic power transmission device comprises a hydraulic recovery connector connected to the return hydraulic line and including a bypass line for selectively providing a detour for the hydraulic oil, and a power transmission hydraulic motor connected to the hydraulic recovery connector and driven by the hydraulic pressure of the hydraulic oil to transfer power to the vehicular auxiliary device, wherein the bypass line comprises a bypass supply line for supplying the hydraulic oil to the hydraulic motor and a bypass return line for returning the hydraulic oil from the hydraulic motor, wherein the hydraulic recovery connector further comprises a first control valve installed in the bypass supply line to connect the bypass supply line to the return hydraulic line and a second control valve installed in the bypass return line to connect the bypass return line to the return hydraulic line, wherein the hydraulic recovery connector further comprises at least one accumulator which is installed in the bypass line between the first control valve and the second control valve, wherein the vehicular auxiliary device comprises a waste heat recovery device for recovering waste heat of the engine, wherein the waste heat recovery device comprises a Rankine circuit which includes an evaporator for vaporizing a working fluid by the waste heat of the engine, a turbine for generating rotary driving force by making use of expansion of the working fluid via the evaporator, a condenser for condensing the working fluid, and a pump for circulating the working fluid to a circulation path of the working fluid, and wherein the hydraulic power transmission device transmits the hydraulic pressure of the hydraulic oil as the driving source to the pump of the Rankine circuit.

7. The engine system of claim 6, wherein the working fluid comprises an organic working fluid.

8. An engine system utilizing a hydraulic pressure, comprising:

an engine;

a hydraulic system having at least one hydraulic pump discharging a hydraulic oil for operating an actuator, a main control valve installed between the hydraulic pump and the actuator and controlling a flow direction of the hydraulic oil from the hydraulic pump to the actuator to selectively supply the hydraulic oil to the actuator for controlling operation of the actuator and a hydraulic oil tank storing the hydraulic oil returned from the actuator through a return hydraulic line;

a hydraulic power transmission device connected to the return hydraulic line between the main control valve and the hydraulic oil tank and configured to transmit a hydraulic pressure of the hydraulic oil flowing through the return hydraulic line after the hydraulic oil is discharged from the hydraulic pump and supplied to the actuator to drive the actuator, as a driving source; and a vehicular auxiliary device driven by using the hydraulic pressure transmitted from the hydraulic power transmission device as the driving source, wherein the hydraulic power transmission device comprises a hydraulic recovery connector connected to the return hydraulic line and including a bypass line for selectively providing a detour for the hydraulic oil, and a power transmission hydraulic motor connected to the hydraulic recovery connector and driven by the hydraulic pressure of the hydraulic oil to transfer power to the vehicular auxiliary device, and wherein the hydraulic recovery connector further comprises a control valve which connects the return hydraulic line and the bypass line to each other, and an accumulator which is installed in the bypass line between the control valve and the hydraulic motor.

9. The engine system of claim 8, wherein the bypass line comprises a bypass supply line for supplying the hydraulic oil to the hydraulic motor and a bypass return line for returning the hydraulic oil from the hydraulic motor, and
wherein the control valve and the accumulator installed in the bypass supply line respectively.

10. The engine system of claim 9, wherein the bypass return line connects the hydraulic motor and the return hydraulic line, and
wherein the hydraulic recovery connector further comprises a second control valve which connects the bypass return line and hydraulic line to each other.

* * * * *